(12) United States Patent
Yang et al.

(10) Patent No.: US 12,655,308 B2
(45) Date of Patent: Jun. 16, 2026

---

(54) WAVE-ABSORBING HEAT-GENERATING COATING FOR MELTING ICE ON WIND TURBINE BLADE, AND PREPARATION METHOD THEREFOR

(71) Applicant: XI'AN THERMAL POWER RESEARCH INSTITUTE CO., LTD., Xi'an (CN)

(72) Inventors: Song Yang, Xi'an (CN); Zhongxu Guo, Xi'an (CN); Guangwen Cheng, Xi'an (CN); Xiaoqian Wang, Xi'an (CN); Mingyu Yao, Xi'an (CN); Chenglong Yang, Xi'an (CN); Ming Cai, Xi'an (CN)

(73) Assignee: XI'AN THERMAL POWER RESEARCH INSTITUTE CO., LTD., Xi'an (CN)

( * ) Notice: Subject to any disclaimer, the term of this patent is extended or adjusted under 35 U.S.C. 154(b) by 122 days.

(21) Appl. No.: 18/711,783

(22) PCT Filed: Jun. 28, 2022

(86) PCT No.: PCT/CN2022/102084
§ 371 (c)(1),
(2) Date: May 20, 2024

(87) PCT Pub. No.: WO2023/087719
PCT Pub. Date: May 25, 2023

(65) Prior Publication Data
US 2026/0002031 A1     Jan. 1, 2026

(30) Foreign Application Priority Data
Nov. 22, 2021     (CN) .......................... 202111387537.4

(51) Int. Cl.
*C09D 5/32* (2006.01)
*B05D 1/38* (2006.01)
(Continued)

(52) U.S. Cl.
CPC ............... *C09D 5/32* (2013.01); *B22F 1/054* (2022.01); *B22F 1/142* (2022.01); *B22F 9/04* (2013.01); *C09D 7/20* (2018.01); *C09D 7/61* (2018.01); *C09D 7/67* (2018.01); *C09D 7/69* (2018.01); *C09D 175/08* (2013.01); *C09D 177/00* (2013.01); *C09D 183/06* (2013.01); *C22C 33/0278* (2013.01); *C22C 38/005* (2013.01); *B05D 1/38* (2013.01); *B05D 3/12* (2013.01); *B05D 5/005* (2013.01); *B05D 7/52* (2013.01); *B05D 7/546* (2013.01); *B05D 2504/00* (2013.01); *B05D 2518/10* (2013.01); *B05D 2518/12* (2013.01); *B22F 2009/041* (2013.01); *B22F 2009/043* (2013.01); *B22F 2201/20* (2013.01); *B22F 2301/355* (2013.01); *B22F 2304/054* (2013.01); *B22F 2998/10* (2013.01); *B22F 2999/00* (2013.01)

(58) Field of Classification Search
CPC ... C09D 5/32; C09D 7/20; C09D 7/61; C09D 7/67; C09D 7/69; C09D 175/08; C09D 177/00; C09D 183/06; B22F 1/054; B22F 1/142; B22F 9/04; B22F 2009/041; B22F 2009/043; B22F 2201/20; B22F 2301/355; B22F 2304/054; B22F 2998/10; B22F 2999/00; C22C 33/0278; C22C 38/005; B05D 1/38; B05D 3/12; B05D 5/00; B05D 5/005; B05D 7/52; B05D 7/546; B05D 2504/00; B05D 2518/10; B05D 2518/12; B05D 2601/20; B05D 2601/28
See application file for complete search history.

(56) References Cited

U.S. PATENT DOCUMENTS 7,405,000 B2 * 7/2008 Takikawa ............... G03G 9/097
                                                                    428/407
2016/0009972 A1     1/2016 Yoldi Sanguesa et al.

FOREIGN PATENT DOCUMENTS

CN          104673063 A  *  6/2015  ............. C08G 77/04
CN          106313812 A      1/2017
(Continued)

OTHER PUBLICATIONS

International Search Report for Application No. PCT/CN2022/102084 dated Sep. 23, 2022, 3 pages.
(Continued)

*Primary Examiner* — William P Fletcher, III
(74) *Attorney, Agent, or Firm* — Howard & Howard Attorneys PLLC

(57)                ABSTRACT

The present invention provides a wave-absorbing heat-generating coating for melting ice on a wind turbine blade, and a preparation method therefor. By means of coating the surface of a wind turbine blade with the material, an ice layer on the surface of the wind turbine blade is removed by means of the cooperation between same and microwaves. The coating provided in the present invention uses environmentally friendly chemical components, can be sprayed on a large area of a wind turbine blade, has the advantages of a self-cleaning ability, resistance to heat and humidity, freezing resistance, etc., and does not corrode the wind turbine blade. By means of the coating of the present invention cooperating with microwaves for de-icing, microwave energy can be better absorbed and converted into heat energy to rapidly melt ice at an interface, thereby loosening an ice surface and detaching same. The coating has the advantages of strong microwave absorption, a wide frequency band, high wear resistance, strong adhesive force, good thermal stability, etc.

8 Claims, No Drawings

(51) Int. Cl.

| | |
|---|---|
| *B05D 3/12* | (2006.01) |
| *B05D 5/00* | (2006.01) |
| *B05D 7/00* | (2006.01) |
| *B22F 1/054* | (2022.01) |
| *B22F 1/142* | (2022.01) |
| *B22F 9/04* | (2006.01) |
| *C09D 7/20* | (2018.01) |
| *C09D 7/40* | (2018.01) |
| *C09D 7/61* | (2018.01) |
| *C09D 175/08* | (2006.01) |
| *C09D 177/00* | (2006.01) |
| *C09D 183/06* | (2006.01) |
| *C22C 33/02* | (2006.01) |
| *C22C 38/00* | (2006.01) |

(56) References Cited

FOREIGN PATENT DOCUMENTS

| | | | |
|---|---|---|---|
| CN | 107629624 A | * | 1/2018 |
| CN | 109627905 A | | 4/2019 |
| CN | 112194984 A | | 1/2021 |
| CN | 112852376 A | | 5/2021 |
| CN | 113522697 A | * | 10/2021 ............. B05D 7/584 |
| CN | 114058331 A | * | 2/2022 ............. C09K 3/185 |
| CN | 114085609 A | | 2/2022 |
| WO | 0000568 A1 | | 1/2000 |

OTHER PUBLICATIONS

English language abstract for CN 104673063 A extracted from espacenet.com database on May 22, 2024, 2 pages.
English language abstract for CN 107629624 A extracted from espacenet.com database on May 22, 2024, 1 page.
English language abstract for CN 109627905 A extracted from espacenet.com database on May 22, 2024, 2 pages.
English language abstract for CN 113522697 A extracted from espacenet.com database on May 22, 2024, 2 pages.
English language abstract for CN 114085609 A extracted from espacenet.com database on May 22, 2024, 2 pages.
Search Report dated Mar. 11, 2022 of corresponding CN patent application No. 2021113875374, 6 pages.

* cited by examiner

WAVE-ABSORBING HEAT-GENERATING COATING FOR MELTING ICE ON WIND TURBINE BLADE, AND PREPARATION METHOD THEREFOR

CROSS-REFERENCE TO RELATED APPLICATIONS

The subject patent application is the National Stage of International Application No. PCT/CN2022/102084, filed on Jun. 28, 2022, which claims priority to Chinese Application No. 202111387537.4, filed on Nov. 22, 2021, the entire contents of which are incorporated by reference herein.

TECHNICAL FIELD

The present application relates to the technical field of wind power generation, in particular to a wave-absorbing heat-generating coating for melting ice on wind turbine blade and preparation method therefor.

BACKGROUND

Wind energy is a renewable energy with huge amount and very clean and safe. Wind turbines are currently the most major equipment for wind energy conversion. Wind energy, as a renewable and clean energy, is getting more and more attention today. Wind power has a bright prospect in China, so there is also a relatively large market demand for corresponding wind turbine blade coatings.

The working environment of wind turbine generator sets is outdoors where wind resources are relatively abundant, and in some wind fields with high ambient humidity, large amount rainfall, and low temperature, when the temperature drops below zero degrees Celsius, ice may form on the wind turbine blades, the ice adheres to the blades and changes the airfoil types of the blades, which not only affects the aerodynamic performance of the blades, reduces the power generation efficiency of the wind turbine device, but also increases the dynamic and static loads of the entire wind turbine device, which has a more adverse effect on the strength and stability of the whole machine. However, existing coatings can only prevent rime from freezing, and cannot stop the condensation of glaze. Therefore, preventing icing and timely removing ice on wind turbine blades are of great significance to ensure the normal and efficient operation of wind turbine devices.

The current main anti-icing technologies are antifreeze anti-icing, mechanical de-icing, thermal energy anti-icing, coating anti-icing, and the like. The above de-icing methods are either inefficient, unable to actively de-icing, or costly and destructive for the streamlines on the blade surfaces.

SUMMARY OF THE INVENTION

The purpose of the present invention is to overcome the shortcomings of the above-mentioned prior art, and provide a wave-absorbing heat-generating coating for melting ice on a wind turbine blade and a preparation method therefor, so as to solve the problem of low efficiency, inability to actively de-icing, high de-icing cost and destruction of streamlines on the blade surface in the prior art.

In order to achieve the above object, the present invention adopts the following technical solutions.

A method for preparing a wave-absorbing heat-generating coating for melting ice on a wind turbine blade, wherein the method comprises the following steps:

step 1, in parts by mass, mixing 20 to 40 parts of methylphenyl silicone resin, 25 to 40 parts of epoxy-modified silicone, 10 to 15 parts of titanium dioxide and 8-15 parts of bentonite, stirring, and grinding by colloid-milling to obtain a component A; mixing the component A and 650 #polyamide resin to obtain a coating for the bottom layer, spraying the coating for the bottom layer on a substrate, curing, repairing and polishing to obtain a bottom layer;

step 2, in parts by mass, mixing 60 to 80 parts of diphenol-based epoxy resin and 16 to 22 parts of polyisocyanate-based polyurethane prepolymer and heating to obtain a polyurethane-modified epoxy resin; mixing 12 to 14 parts of a diphenol-based epoxy resin, 3 to 4 parts of a diluent, 0.5 to 1 part of a filler, 3 to 8 parts of cerium-iron alloy nanometer powder and 8 to 12 parts of a curing agent evenly and adding into the polyurethane modified epoxy resin, and then adding 3 to 6 parts of silicon carbide particles and 0.2 to 0.4 parts of a dispersant and stirring evenly to obtain a coating for the surface layer, scrape-coating the coating for the surface layer on the bottom layer, and heating during the scrape-coating process to obtain a surface layer.

The further improvements of the present invention are as follows.

Preferably, in step 1, the mixture was ground to a particle diameter of 40 μm or smaller by colloid-milling.

Preferably, in step 2, a heating temperature during the scrape-coating process is in a range from 60° C. to 70° C.

Preferably, in step 2, the diphenol-based epoxy resin is E-51 or E44.

Preferably, in step 2, the diluent is epoxypropane butyl ether; and the filler is glass powder.

Preferably, in step 2, in parts by mass, the curing agent is prepared by mixing 4 to 6 parts of ethylenediamine, 2 to 3 parts of phenolic aldehyde amine and 1 to 1.5 parts of dimethylaminoethanol.

Preferably, a method for preparing the cerium-iron alloy nanometer powder used in step 2 comprises: mixing cerium powder and iron powder according to a mass ratio of 15:85 to obtain a cerium-iron powder; then a high-energy ball-milling is performed on the cerium-iron powder to obtain a nanometer powder of 50 nm to 100 nm; and obtaining the cerium-iron alloy nanometer powder after heat-treating the nanometer powder in a vacuum heat treatment furnace.

Preferably, the temperature for the heat-treating is in a range from 300° C. to 500° C., and the time for the heat-treating is in a range from 2 hours to 5 hours.

A wave-absorbing heat-generating coating for melting ice on a wind turbine blade prepared by the method of any one of above, wherein the wave-absorbing heat-generating coating for melting ice on a wind turbine blade comprises a bottom layer and a surface layer, the bottom layer is arranged outside the substrate, and the surface layer is outside the bottom layer.

Preferably, the bottom layer has a thickness ranging from 200 μm to 350 μm, and the surface layer has a thickness ranging from 800 μm to 1500 μm.

Compared with the prior art, the present invention has the following beneficial effects.

The present invention provides a wave-absorbing heat-generating coating for melting ice on a wind turbine blade, and a preparation method therefor. By means of coating the surface of a wind turbine blade with this coating material and cooperating with the use of microwaves, an ice layer on the surface of the wind turbine blade is removed. The coating provided in the present invention uses environmentally friendly chemical components, can be sprayed on a large area of a wind turbine blade, has the advantages of a self-cleaning ability, resistance to heat and humidity, freezing resistance, etc., and does not corrode the wind turbine blade. The coating of the present invention cooperating with microwaves is used for de-icing, and microwave energy can be better absorbed and converted into heat energy to rapidly melt ice at an interface, thereby loosening an ice surface and detaching the ice from the blade. The coating has the advantages of strong microwave absorption, a wide frequency band, high wear resistance, strong adhesive force, good thermal stability, etc.

DETAILED DESCRIPTION

The present invention is further described in detail below in combination with specific examples.

The present invention discloses a method for preparing a coating for wind turbine blades. The coating comprises two layers, a bottom layer for coating and a surface layer for coating. The coating bottom layer comprises a coating bottom layer and a coating surface layer, and bottom layer for coating contacted with the pretreated substrate directly, and the bottom layer for coating is an epoxy-modified silicone coating. The coating comprises two components, component A and component B, wherein, in parts by mass, component A comprises 20 to 40 parts of methylphenyl silicone resin, 25 to 40 parts of epoxy-modified silicone as film-forming material, 10 to 15 parts of titanium dioxide as pigment and 8-15 parts of bentonite as filler; component B is 650 #polyamide resin, and the raw material of component B is used as a curing agent.

In parts by mass, the surface layer for coating comprises 72 to 94 parts of a diphenol-based epoxy resin, 16 to 22 parts of a polyisocyanate-based polyurethane prepolymer, 3 to 4 parts of a diluent, 0.5 to 1 part of a filler, 3 to 8 parts of cerium-iron alloy nanometer powder, 8 to 12 parts of a curing agent, 3 to 6 parts of silicon carbide particles of 50 μm and 0.2 to 0.4 parts of a dispersant.

Preferably, the diphenol-based epoxy resin is diphenol-based epoxy resin E-51 or diphenol-based epoxy resin E44, the diluent is epoxypropane butyl ether; and the filler is glass powder with a particle diameter of 50 μm, the curing agent is prepared by mixing 4 to 6 parts of ethylenediamine, 2 to 3 parts of phenolic aldehyde amine and 1 to 1.5 parts of dimethylaminoethanol.

Preferably, the polyisocyanate-based polyurethane prepolymer is prepared from toluene-2,4-diisocyanate with a mass fraction of 80% and toluene-2,6-diisocyanate with a mass fraction of 20%.

Preferably, the bottom layer for coating has a thickness ranging from 200 μm to 350 μm, and the surface layer for coating has a thickness ranging from 800 μm to1500 μm.

The method for preparing the surface layer for coating comprises:

The method for preparing the bottom layer for coating comprises: methylphenyl silicone resin, epoxy-modified silicone resin, titanium dioxide and bentonite were mixed and stirred, and ground by colloid-milling to form a particle diameter of 40 μm or smaller to obtain component A; component A and component B curing agent were mixed and stirred to obtain the coating for the bottom layer, which can be used. When using, the coating for the bottom layer was sprayed on a pre-treated substrate, cured, repaired and polished.

The method for preparing the surface layer for coating comprises: 60 to 80 parts of diphenol-based epoxy resin and 16 to 22 parts of polyisocyanate-based polyurethane prepolymer were mixed and heated to obtain a polyurethane-modified epoxy resin; 12 to 14 parts of a diphenol-based epoxy resin, 3 to 4 parts of a diluent, 0.5 to 1 part of a filler, 3 to 8 parts of cerium-iron alloy nanometer powder and 8 to 12 parts of a curing agent were mixed evenly and added into the polyurethane modified epoxy resin, and then 3 to 6 parts of silicon carbide particles of 50 μm and 0.2 to 0.4 parts of a dispersant were added and stirred evenly, heated and scrape-coated on the bottom layer.

Preferably, during the coating process of the surface layer, a heating temperature is in a range from 60° C. to 70° C.

Preferably, a method for preparing the cerium-iron alloy nanometer powder comprises the following steps:
- (1) Weighing materials: Ce and Fe metal powders with a purity of 99.9% or more were used as raw materials, and cerium-iron powder is obtained according to the mass percentage Ce:Fe=15:85;
- (2) High-energy ball-milling: high-energy ball-milling was used to prepare rare earth cerium-iron alloy powder from cerium-iron powder; zirconia balls and pure cerium-iron powder were put into a stainless steel tank at a mass ratio of 8:1, paraffin was used as a grinding aid, ball-milling was performed for 40 hours, the rotating speed of the ball mill is 200 r/min, and the nanometer powder of 50 nm to 100 nm was obtained;
- (3) Vacuum heat treatment: the rare earth cerium-iron alloy powder was subjected to an vacuum heat treatment to obtain cerium-iron alloy nanometer powder; the main process of vacuum heat treatment comprises: the rare earth cerium-iron alloy powder was put in a vacuum heat treatment furnace, the vacuum heat treatment furnace was vacuumed and purged with argon for 3 to 5 times. Then, the temperature is raised to 300° C. to 500° C. according to the heating rate ranging from 10° C./min to 17° C./min, kept for 2-5 hours, and then cooled with the furnace.

The raw materials used in the present invention have the following characteristics.

Coating for the bottom layer: it has relatively high adhesion to the blade, and the coating formulation has good heat resistance and heat insulation performance, which can protect the blade and prevent the thermal corrosion to the blade after the material in the surface layer absorbs heat.

Titanium dioxide: since the melting point of titanium dioxide is as high as 1830° C., it has good thermal stability and strong hiding power, which is used to improve the heat resistance of the coating.

Bentonite: bentonite mainly reinforces epoxy-modified silicone.

650 #polyamide resin: 650 low-molecular weight polyamide is a chemical substance used as a tough curing agent for epoxy resin adhesives; the reference dosage is 50 to 100 parts, and the curing conditions are room temperature/2 to 5 days or 65° C./4 h.

Coating for the surface layer: both the coatings for the surface layer and the bottom layer contain epoxy-based materials, and there is good cooperation compatibility between the two layers, which gives the coating system not only relatively high anti-corrosion performance and adhesion, but also good wear resistance, thermal stability, and the ability of absorbing microwave to generate heat.

Glass powder: it can increase the hardness and toughness of the topcoat, improve the scratch resistance of the film, has a matting effect, and can improve the weather resistance of the film.

Cerium-iron alloy: it enhances the frequency for absorbing microwaves, increases the absorption range, and absorbs waves to generate heat.

The present invention is further described in detail below in combination with specific examples.

Example 1

Step 1, in parts by mass, 30 parts of methylphenyl silicone resin, 30 parts of epoxy-modified silicone, 12 parts of titanium dioxide and 13 parts of bentonite were mixed, stirred, and ground by colloid-milling to a particle diameter of 40 μm or smaller to obtain component A; component A and 650 #polyamide resin were mixed to obtain a coating for the bottom layer, the coating for the bottom layer was sprayed on a substrate, cured, repaired and polished to obtain a bottom layer; and the bottom layer has a thickness of 300 μm.

Step 2, in parts by mass, 72 parts of E-51 and 20 parts of polyisocyanate-based polyurethane prepolymers were mixed and heated to obtain a polyurethane-modified epoxy resin; 13 parts of E-51, 3 parts of epoxypropane butyl ether, 0.8 parts of glass powder, 6 parts of cerium-iron alloy nanometer powder and 10 parts of curing agent were mixed evenly and added into the polyurethane-modified epoxy resin, then 4 parts of silicon carbide particles and 0.3 part of dispersant were added, and stirred evenly to obtain a coating for the surface layer, the coating for the surface layer was scrape-coated on the bottom layer, and heated at 65° C. during the scrape-coating process to obtain a surface layer, and the surface layer has a thickness of 1000 μm.

Wherein, the curing agent was prepared by mixing 5 parts of ethylenediamine, 2 parts of phenolic aldehyde amine and 1.2 parts of dimethylaminoethanol. The polyisocyanate-based polyurethane prepolymer was prepared from toluene-2,4-diisocyanate with a mass fraction of 80% and toluene-2,6-diisocyanate with a mass fraction of 20%.

Wherein, a process for preparing the cerium-iron alloy nanometer powder comprises the following steps:
(1) Weighing materials: Ce and Fe metal powders with a purity of 99.9% or more were used as raw materials, the materials were prepared according to the mass percentage Ce:Fe=15:85, and cerium-iron powder was obtained;
(2) High-energy ball-milling: high-energy ball-milling was used to prepare rare earth cerium-iron alloy powder from cerium-iron powder; zirconia balls and pure cerium-iron powder were put into a stainless steel tank at a mass ratio of 8:1, and paraffin was used as a grinding aid, ball-milling was performed for 40 hours, the rotating speed of the ball mill was 200 r/min, and the nanometer powder of 50 nm to 100 nm was obtained;
(3) Vacuum heat treatment: the rare earth cerium-iron alloy powder was subjected to an vacuum heat treatment to obtain cerium-iron alloy nanometer powder; the main process of vacuum heat treatment comprises: the rare earth cerium-iron alloy powder was put in a vacuum heat treatment furnace, vacuumed, and purged with argon for 4 times. Then, the temperature was raised to 400° C. according to the heating rate of 15° C./min, kept for 3 hours, and then cooled with the furnace.

Example 2

Step 1, in parts by mass, 25 parts of methylphenyl silicone resin, 28 parts of epoxy-modified silicone, 11 parts of titanium dioxide and 8 parts of bentonite were mixed, stirred, and ground by colloid-milling to a particle diameter of 40 μm or smaller to obtain component A; component A and 650 #polyamide resin were mixed to obtain a coating for the bottom layer, the coating for the bottom layer was sprayed on a substrate, cured, repaired and polished to obtain a bottom layer; and the bottom layer has a thickness of 200 μm.

Step 2, in parts by mass, 94 parts of E44 and 19 parts of polyisocyanate-based polyurethane prepolymers were mixed and heated to obtain a polyurethane-modified epoxy resin; 12 parts of E-51, 4 parts of epoxypropane butyl ether, 0.9 parts of glass powder, 3 parts of cerium-iron alloy nanometer powder and 8 parts of curing agent were mixed evenly and added into the polyurethane-modified epoxy resin, then 5 parts of silicon carbide particles and 0.2 part of dispersant were added, and stirred evenly to obtain a coating for the surface layer, the coating for the surface layer was scrape-coated on the bottom layer, and heated at 60° C. during the scrape-coating process to obtain a surface layer, and the surface layer has a thickness of 800 μm.

Wherein, the curing agent was prepared by mixing 4 parts of ethylenediamine, 2 parts of phenolic aldehyde amine and 1 part of dimethylaminoethanol. The polyisocyanate-based polyurethane prepolymer was prepared from toluene-2,4-diisocyanate with a mass fraction of 80% and toluene-2,6-diisocyanate with a mass fraction of 20%.

Wherein, a process for preparing the cerium-iron alloy nanometer powder comprises the following steps:
(1) Weighing materials: Ce and Fe metal powders with a purity of 99.9% or more were used as raw materials, the materials were prepared according to the mass percentage Ce:Fe=15:85, and cerium-iron powder was obtained;
(2) High-energy ball-milling: high-energy ball-milling was used to prepare rare earth cerium-iron alloy powder from cerium-iron powder; zirconia balls and pure cerium-iron powder were put into a stainless steel tank at a mass ratio of 8:1, and paraffin was used as a grinding aid, ball-milling was performed for 40 hours, the rotating speed of the ball mill was 200 r/min, and the nanometer powder of 50 nm to 100 nm was obtained;
(3) Vacuum heat treatment: the rare earth cerium-iron alloy powder was subjected to an vacuum heat treatment to obtain cerium-iron alloy nanometer powder; the main process of vacuum heat treatment comprises: the rare earth cerium-iron alloy powder was put in a vacuum heat treatment furnace, vacuumed, and purged with argon for 3 times. Then, the temperature was raised to 350° C. according to the heating rate of 10° C./min, kept for 2 hours, and then cooled with the furnace.

Example 3

Step 1, in parts by mass, 35 parts of methylphenyl silicone resin, 32 parts of epoxy-modified silicone, 10 parts of titanium dioxide and 15 parts of bentonite were mixed, stirred, and ground by colloid-milling to a particle diameter of 40 μm or smaller to obtain component A; component A and 650 #polyamide resin were mixed to obtain a coating for the bottom layer, the coating for the bottom layer was sprayed on a substrate, cured, repaired and polished to obtain a bottom layer; and the bottom layer has a thickness of 350 μm.

Step 2, in parts by mass, 80 parts of E-51 and 18 parts of polyisocyanate-based polyurethane prepolymers were mixed and heated to obtain a polyurethane-modified epoxy resin; 14 parts of E-51, 3 parts of epoxypropane butyl ether, 1 part of glass powder, 8 parts of cerium-iron alloy nanometer powder and 12 parts of curing agent were mixed evenly and added into the polyurethane-modified epoxy resin, then 6 parts of silicon carbide particles and 0.4 parts of dispersant were added, and stirred evenly to obtain a coating for the surface layer, the coating for the surface layer was scrape-coated on the bottom layer, and heated at 70° C. during the scrape-coating process to obtain a surface layer, and the surface layer has a thickness of 1500 μm.

Wherein, the curing agent was prepared by mixing 4 parts of ethylenediamine, 2 parts of phenolic aldehyde amine and 1.4 parts of dimethylaminoethanol. The polyisocyanate-based polyurethane prepolymer was prepared from toluene-2,4-diisocyanate with a mass fraction of 80% and toluene-2,6-diisocyanate with a mass fraction of 20%.

Wherein, a process for preparing the cerium-iron alloy nanometer powder comprises the following steps:

(1) Weighing materials: Ce and Fe metal powders with a purity of 99.9% or more were used as raw materials, the materials were prepared according to the mass percentage Ce:Fe=15:85, and cerium-iron powder was obtained;

(2) High-energy ball-milling: high-energy ball-milling was used to prepare rare earth cerium-iron alloy powder from cerium-iron powder; zirconia balls and pure cerium-iron powder were put into a stainless steel tank at a mass ratio of 8:1, paraffin was used as a grinding aid, ball-milling was performed for 40 hours, the rotating speed of the ball mill was 200 r/min, and the nanometer powder of 50 nm to 100 nm was obtained;

(3) Vacuum heat treatment: the rare earth cerium-iron alloy powder was subjected to an vacuum heat treatment to obtain cerium-iron alloy nanometer powder; the main process of vacuum heat treatment comprises: the rare earth cerium-iron alloy powder was put in a vacuum heat treatment furnace, vacuumed, and purged with argon for 5 times. Then, the temperature was raised to 500° C. according to the heating rate of 15°

C./min, kept for 5 hours, and then cooled with the furnace.

2. Evaluation of De-Icing Agent Effect

In order to test the snow-melting and de-icing ability of the heat-absorbing coating using microwave prepared by the present invention, a simulation experiment was designed. The specific operation was as follows: applying two types of commercially available anti-icing coatings and the anti-icing coatings of Examples 1-3 of the present invention to the blade material 1 with a diameter of 5 cm. 50 g of deionized water was added into each of 15 beakers, frozen at −10° C. for 12 hours after putting them in, and made into cylinders with a bottom diameter of 5 cm after treatment. With or without the effect of microwaves, the mass of the remaining of the ice cylinders was weighed every 15 minutes in an environment at a temperature of 5° C. The initial mass of the ice cylinders minus the remaining mass was the cumulative ice melting amount of the material. Three parallel tests were carried out for each material, and the average value was taken as the final cumulative ice melting amount. The test results are shown in Table 1.

TABLE 1

| | | Cumulative ice melting amount of each sample | | | | |
|---|---|---|---|---|---|---|
| | | Sample type | | | | |
| Time (min) | Presence or absence of microwave | Commercially available coating number 1 | Commercially available coating number 2 | Self made coating | | |
| | | | | Example 1 | Example 2 | Example 3 |
| 0 min | Absence | 0 | 0 | 0 | 0 | 0 |
| 5 min | Absence | 3.5 | 3.2 | 3.7 | 3.1 | 3.3 |
| 10 min | Presence | 8.6 | 8.7 | 16.8 | 16.2 | 17.0 |
| 15 min | Presence | 14.8 | 14.5 | Peel off | Peel off | Peel off |
| 20 min | Presence | 20.9 | 20.1 | | | |
| 25 min | Presence | Peel off | 28.7 | | | |

It can be seen from the above Table 1 that after 5 minutes, microwaves were added to the ice cylinders, and it was found that microwaves had a certain synergistic effect on commercially available coatings, but had a significant synergistic effect on self made de-icing agents. In the same time period, the amount of coating prepared by the present invention was obviously higher than that of the two commercially available de-icing agents when microwaves are present. The ice layer can be peeled off after 25 minutes using the two commercially available de-icing agents, while the ice layer can be peeled off within 15 minutes using the de-icing agent prepared by the present invention, and the de-icing efficiency was obviously improved.

Example 4

Step 1, in parts by mass, 20 parts of methylphenyl silicone resin, 35 parts of epoxy-modified silicone, 13 parts of titanium dioxide and 10 parts of bentonite were mixed, stirred, and ground by colloid-milling to a particle diameter of 40 μm or smaller to obtain component A; component A and 650 #polyamide resin were mixed to obtain a coating for the bottom layer, the coating for the bottom layer was sprayed on a substrate, cured, repaired and polished to obtain a bottom layer; and the bottom layer has a thickness of 250 μm.

Step 2, in parts by mass, 85 parts of E-44 and 21 parts of polyisocyanate-based polyurethane prepolymers were mixed and heated to obtain a polyurethane-modified epoxy resin; 13 parts of E-51, 4 parts of epoxypropane butyl ether, 0.5 parts of glass powder, 5 parts of cerium-iron alloy nanometer powder and 9 parts of curing agent were mixed evenly and added into the polyurethane-modified epoxy resin, then 3 parts of silicon carbide particles and 0.3 part of dispersant were added, and stirred evenly to obtain a coating for the surface layer, the coating for the surface layer was scrape-coated on the bottom layer, and heated at 62° C. during the scrape-coating process to obtain a surface layer, and the surface layer has a thickness of 900 μm.

Wherein, the curing agent was prepared by mixing 6 parts of ethylenediamine, 3 parts of phenolic aldehyde amine and 1.5 parts of dimethylaminoethanol. The polyisocyanate-based polyurethane prepolymer was prepared from toluene-2,4-diisocyanate with a mass fraction of 80% and toluene-2,6-diisocyanate with a mass fraction of 20%.

Wherein, a process for preparing the cerium-iron alloy nanometer powder comprises the following steps:

(1) Weighing materials: Ce and Fe metal powders with a purity of 99.9% or more were used as raw materials, the materials were prepared according to the mass percentage Ce:Fe=15:85, and cerium-iron powder was obtained;

(2) High-energy ball-milling: high-energy ball-milling was used to prepare rare earth cerium-iron alloy powder from cerium-iron powder; zirconia balls and pure cerium-iron powder were put into a stainless steel tank at a mass ratio of 8:1, paraffin was used as a grinding aid, ball-milling was performed for 40 hours, the rotating speed of the ball mill was 200 r/min, and the nanometer powder of 50-100 nm was obtained;

(3) Vacuum heat treatment: the rare earth cerium-iron alloy powder was subjected to an vacuum heat treatment to obtain cerium-iron alloy nanometer powder; the main process of vacuum heat treatment comprises: the rare earth cerium-iron alloy powder was put in a vacuum heat treatment furnace, vacuumed, and purged with argon for 4 times. Then, the temperature was raised to 300° C. according to the heating rate of 15° C./min, kept for 4 hours, and then cooled with the furnace.

Example 5

Step 1, in parts by mass, 40 parts of methylphenyl silicone resin, 40 parts of epoxy-modified silicone, 15 parts of titanium dioxide and 14 parts of bentonite were mixed, stirred, and ground by colloid-milling to a particle diameter of 40 μm or smaller to obtain component A; component A and 650 #polyamide resin were mixed to obtain a coating for the bottom layer, the coating for the bottom layer was sprayed on a substrate, cured, repaired and polished to obtain a bottom layer; and the bottom layer has a thickness of 320 μm.

Step 2, in parts by mass, 90 parts of E-51 and 20 parts of polyisocyanate-based polyurethane prepolymers were mixed and heated to obtain a polyurethane-modified epoxy resin; 14 parts of E-51, 3 parts of epoxypropane butyl ether, 0.6 parts of glass powder, 7 parts of cerium-iron alloy nanometer powder and 11 parts of curing agent were mixed evenly and added into the polyurethane-modified epoxy resin, then 5 parts of silicon carbide particles and 0.2 parts of dispersant were added, and stirred evenly to obtain a coating for the surface layer, the coating for the surface layer was scrape-coated on the bottom layer, and heated at 68° C.

during the scrape-coating process to obtain a surface layer, and the surface layer has a thickness of 1200 μm.

Wherein, the curing agent was prepared by mixing 6 parts of ethylenediamine, 3 parts of phenolic aldehyde amine and 1.3 parts of dimethylaminoethanol. The polyisocyanate-based polyurethane prepolymer was prepared from toluene-2,4-diisocyanate with a mass fraction of 80% and toluene-2,6-diisocyanate with a mass fraction of 20%.

Wherein, a process for preparing the cerium-iron alloy nanometer powder comprises the following steps:

(1) Weighing materials: Ce and Fe metal powders with a purity of 99.9% or more were used as raw materials, the materials were prepared according to the mass percentage Ce:Fe=15:85, and cerium-iron powder was obtained;

(2) High-energy ball-milling: high-energy ball-milling was used to prepare rare earth cerium-iron alloy powder from cerium-iron powder; zirconia balls and pure cerium-iron powder were put into a stainless steel tank at a mass ratio of 8:1, paraffin was used as a grinding aid, ball-milling was performed for 40 hours, the rotating speed of the ball mill was 200 r/min, and the nanometer powder of 50-100 nm was obtained;

(3) Vacuum heat treatment: the rare earth cerium-iron alloy powder was subjected to an vacuum heat treatment to obtain cerium-iron alloy nanometer powder; the main process of vacuum heat treatment comprises: the rare earth cerium-iron alloy powder was put in a vacuum heat treatment furnace, vacuumed, and purged with argon for 3 times. Then, the temperature was raised to 450° C. according to the heating rate of 10° C./min, kept for 3 hours, and then cooled with the furnace.

The above descriptions are only preferred embodiments of the present invention, and are not intended to limit the present invention. Any modifications, equivalent replacements, improvements, etc. made within the spirit and principles of the present invention shall be included in the protection scope of the present invention.

The invention claimed is:

1. A method for preparing a wave-absorbing heat-generating coating for melting ice on a wind turbine blade, wherein the method comprises the following steps:

step 1, in parts by mass, mixing 20 to 40 parts of methylphenyl silicone resin, 25 to 40 parts of epoxy-modified silicone, 10 to 15 parts of titanium dioxide and 8-15 parts of bentonite, stirring, and grinding by colloid-milling to obtain a mixture, component A; mixing component A and 650 # polyamide resin to obtain a coating for a bottom layer, spraying the coating for the bottom layer on a substrate, curing, repairing and polishing to obtain the bottom layer; and step 2, in parts by mass, mixing 60 to 80 parts of diphenol-based epoxy resin and 16 to 22 parts of polyisocyanate-based polyurethane prepolymer, and heating to obtain a polyurethane-modified epoxy resin; mixing 12 to 14 parts of a diphenol-based epoxy resin, 3 to 4 parts of a diluent, 0.5 to 1 part of a filler, 3 to 8 parts of cerium-iron alloy nanometer powder and 8 to 12 parts of a curing agent and adding into the polyurethane modified epoxy resin, and then adding 3 to 6 parts of silicon carbide particles and 0.2 to 0.4 parts of a dispersant and stirring to obtain a coating for a surface layer, scrape-coating the coating for the surface layer on the bottom layer, and heating during the scrape-coating process to obtain the surface layer.

2. The method for preparing a wave-absorbing heat-generating coating for melting ice on a wind turbine blade of claim 1, wherein, in step 1, the mixture was ground to a particle diameter of 40 μm or smaller by colloid-milling.

3. The method for preparing a wave-absorbing heat-generating coating for melting ice on a wind turbine blade of claim 1, wherein, in step 2, a temperature for the heating during the scrape-coating process is in a range from 60° C. to 70° C.

4. The method for preparing a wave-absorbing heat-generating coating for melting ice on a wind turbine blade of claim 1, wherein, in step 2, the diphenol-based epoxy resin is E-51 or E44.

5. The method for preparing a wave-absorbing heat-generating coating for melting ice on a wind turbine blade of claim 1, wherein, in step 2, the diluent is epoxypropane butyl ether and the filler is glass powder.

6. The method for preparing a wave-absorbing heat-generating coating for melting ice on a wind turbine blade of claim 1, wherein, in step 2, in parts by mass, the curing agent is prepared by mixing 4 to 6 parts of ethylenediamine, 2 to 3 parts of phenolic aldehyde amine and 1 to 1.5 parts of dimethylaminoethanol.

7. The method for preparing a wave-absorbing heat-generating coating for melting ice on a wind turbine blade of claim 1, wherein a process for preparing the cerium-iron alloy nanometer powder used in step 2 comprises: mixing cerium powder and iron powder according to a mass ratio of 15:85 to obtain a cerium-iron powder; then a high-energy ball-milling is performed on the cerium-iron powder to obtain a nanometer powder of 50 nm to 100 nm; and heat-treating the nanometer powder in a vacuum heat treatment furnace to obtain the cerium-iron alloy nanometer powder.

8. The method for preparing a wave-absorbing heat-generating coating for melting ice on a wind turbine blade of claim 7, wherein a temperature for the heat-treating is in a range from 300° C. to 500° C., and the time for the heat-treating is in a range from 2 hours to 5 hours.

\* \* \* \* \*